United States Patent [19]
Adell

[11] 4,239,724
[45] Dec. 16, 1980

[54] METHOD FOR MAKING VALUED PLASTIC ARTICLES SUCH AS GAME TILES

[75] Inventor: Robert Adell, Bloomfield Hills, Mich.

[73] Assignee: U.S. Product Development Co., Novi, Mich.

[21] Appl. No.: 939,679

[22] Filed: Sep. 5, 1978

[51] Int. Cl.² .................. B29F 1/14; B29F 1/06
[52] U.S. Cl. .................. 264/328.8; 264/132; 264/328.16; 264/334; 264/297; 249/67; 249/110; 249/142; 425/572; 425/556; 425/588
[58] Field of Search ............ 264/132, 328, 334; 249/66 R, 67, 68, 142, 145; 425/542, 577, 588, 556, 572

[56] References Cited
U.S. PATENT DOCUMENTS

| | | | |
|---|---|---|---|
| 1,930,815 | 10/1933 | Lund | 249/68 |
| 3,559,249 | 2/1971 | Patton | 425/577 X |
| 3,651,191 | 3/1972 | Glatt et al. | 264/132 X |
| 3,767,496 | 10/1973 | Amberg et al. | 264/132 X |
| 3,904,165 | 9/1975 | DenBoer | 249/142 X |
| 3,982,875 | 9/1976 | Abey | 249/66 R X |
| 3,996,330 | 12/1976 | Jones et al. | 264/328 |

*Primary Examiner*—J. Howard Flint, Jr.

[57] ABSTRACT

The method of making valued plastic articles, such as game tiles and the like, comprising providing in one of a pair of separable mold members ejector pins for forcibly ejecting the tiles and severing them from residual plastic and providing in the other mold member protuberances which form indentations in one face of each tile which are essentially identical to indentations formed in the other face by the ejector pins. Indicia designating the value of a tile is subsequently applied to either face, the necessity of sorting of the tiles prior to application of indicia being eliminated by the invention.

1 Claim, 12 Drawing Figures

U.S. Patent Dec. 16, 1980 Sheet 1 of 2 4,239,724
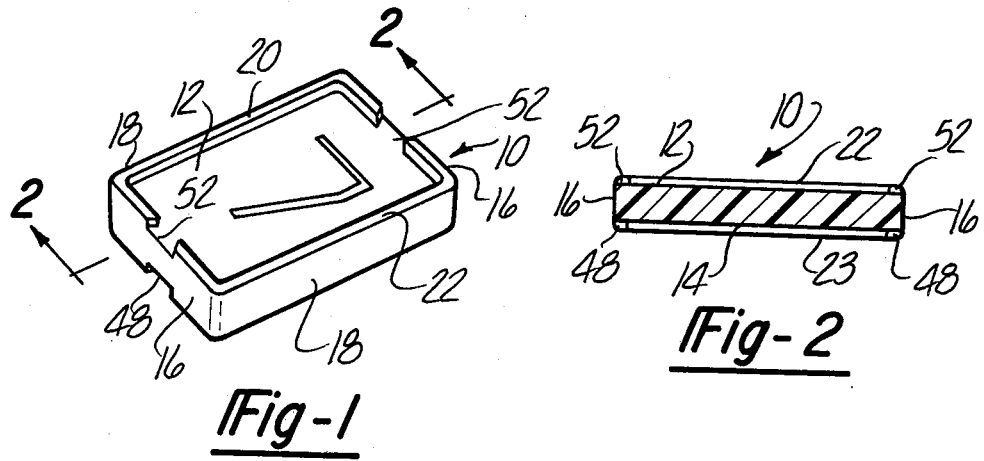
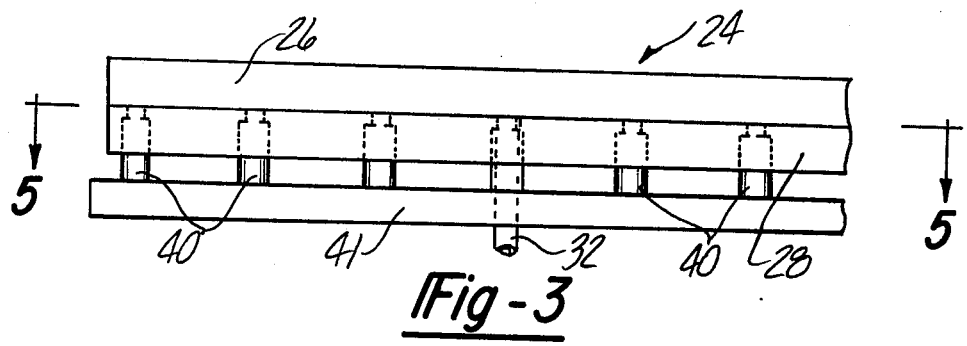
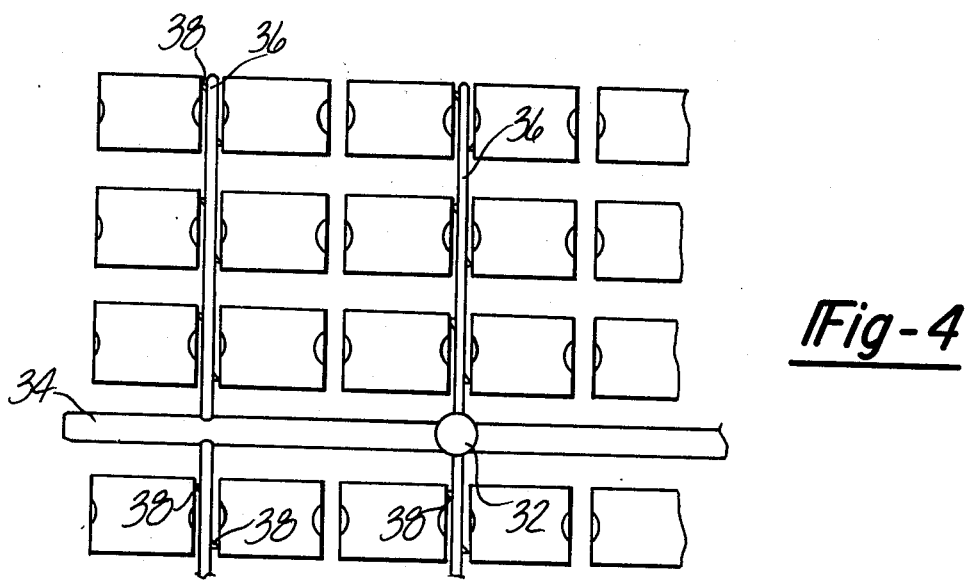

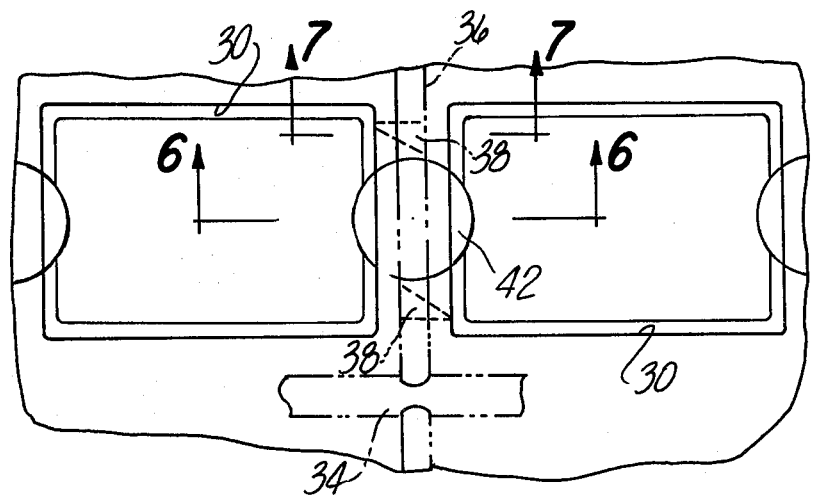
*Fig-5*
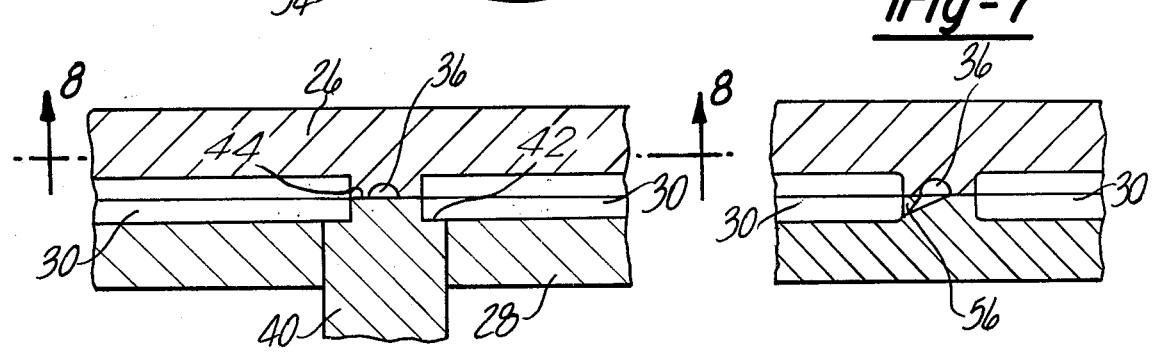
*Fig-7*
*Fig-6*
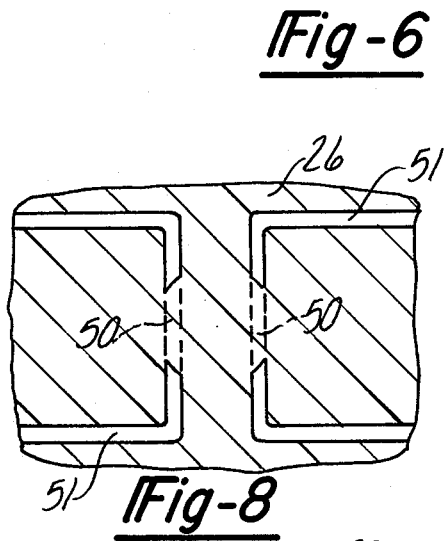
*Fig-8*
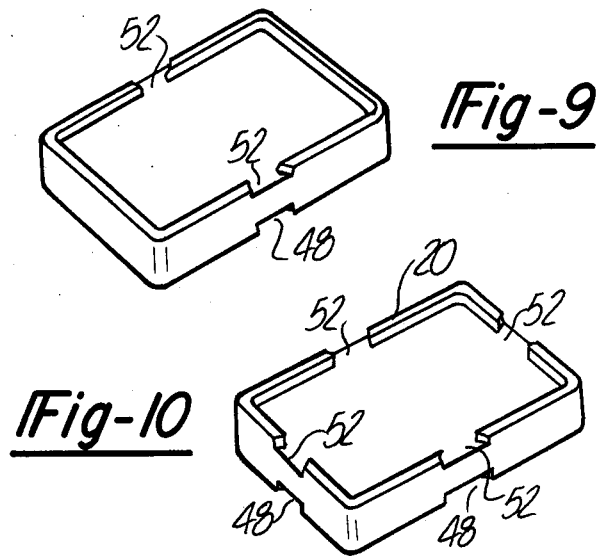
*Fig-9*
*Fig-10*
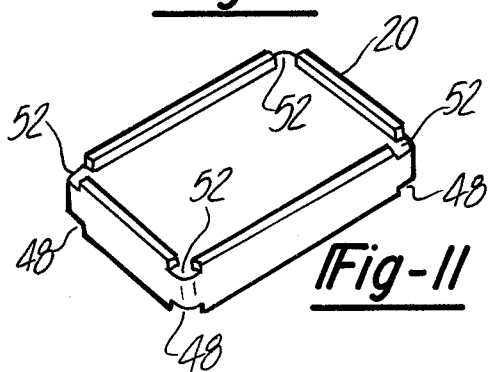
*Fig-11*
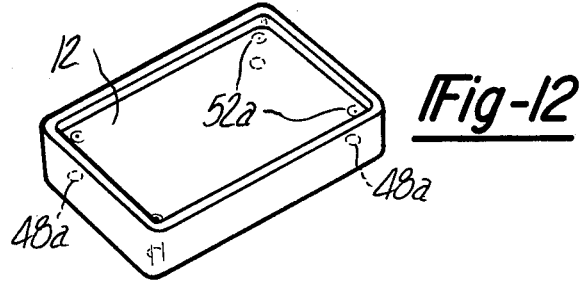
*Fig-12*

METHOD FOR MAKING VALUED PLASTIC ARTICLES SUCH AS GAME TILES

This invention relates to a method for making valued plastic articles such as game pieces, tiles, tokens or chips.

Gaming apparatus to which the present invention is applicable may include a large number of identically shaped game pieces in the form of tokens or tiles which have various values and are used for playing various games such as those played with cards, for example. The values of the tiles are concealed from opponents and for that reason it is necessary that all of the tiles are of uniform appearance except for the indicia denoting their value. Such tiles or tokens commonly are made of plastic by injection molding in multiple cavity molds. In one such method hot thermoplastic resin is delivered from a sprue to a delivery system including runners communicating through gates with each of the mold cavities. After the mold is opened, the solidified plastic in the form of tiles and the attached delivery system made up by the runners and the gates are removed from the mold parts as a unit. Thereafter, the delivery system and the tiles are separated from each other in a separate operation which shears the tiles from the scrap plastic which hardened in the delivery system. Efforts to eliminate the separating operation require the formation of a mold using ejection pins acting directly on the tile or other finished product. The contact points of the ejection pins with the tiles make visible marks on one side of the tiles making it necessary to carefully orient each tile in preparation for printing of valued indicia to insure that the printing occurs on the corresponding side of all tiles so that the non-indicia containing sides of all tiles appear identical.

It is an object of the invention to provide a method of making tiles wherein the tiles are formed with identical opposed surfaces so either side can be printed with indicia.

It is an object of the invention to provide such a method wherein tiles may be removed from a mold independently of each other and separate from any scrap in the mold filling system.

Another object of the invention is to provide a method for making tiles which utilizes an ejection pin arrangement not only to remove the tiles from the cavities but also to make a decorative marking on the tiles.

The objects of the invention are accomplished in the embodiment disclosed herein by providing a method by which rectangular shaped game tiles having identical oppositely facing surfaces are formed in a mold such that ejection pins are moved simultaneously to move all of the tiles from the mold and wherein the ejection pins form a decorative design in one surface of the tiles. The mold is formed so that identical markings are formed on the opposite face of the tile to insure that oppositely facing configurations of the tiles are identical. Upon relative movement of the ejection pins relative to one of the mold parts the tiles are ejected from the mold and at the same time are severed from the connecting mold filling plastic delivery system so that it is unnecessary to perform a separate severing operation. The tiles are subsequently printed with valued indicia on either side thereby eliminating the orientation requirement referred to above.

These and other objects of the invention will be apparent from the following description and from the drawings in which:

FIG. 1 is a perspective view of a tile which is made by the process of the present invention;

FIG. 2 is a cross sectional view taken generally on line 2-2 in FIG. 1;

FIG. 3 is a schematic front view of molding apparatus for making tiles;

FIG. 4 is a view of the molded plastic core as it would appear in the mold with all of the mold parts broken away.

FIG. 5 is a view at an enlarged scale of a portion of the mold taken substantially on line 5—5 in FIG. 3;

FIG. 6 is a cross sectional view taken on line 6—6 in FIG. 5;

FIG. 7 is a cross sectional view taken on line 7—7 in FIG. 5;

FIG. 8 is a cross sectional view taken on line 8—8 in FIG. 6;

FIGS. 9, 10, 11 and 12 illustrate various forms of tiles which may be made by the present method.

Referring to the drawings, and in particular to FIGS. 1 and 2, the tile which is made by the present method is designated generally at 10 and has a rectangular configuration with opposed plane surfaces 12 and 14, ends 16 and sides 18. A frame 20 is formed around the perimeters of the surfaces 12 and 14 and forms opposed, identical beads 22 and 23. The beads 22 and 23 maintain the surfaces 12 and 14 in spaced relationship from any playing surface or from the surfaces on other tiles when the tiles are stacked relative to each other. One of the surfaces 12,14 on all of the tiles is marked with indicia indicating the game value. Typically, when tiles 10 are used for playing card type game, a full set of tiles will include thirteen denominations and four suits for a total of at least fifty two different tiles. Because of the large number of tiles that are required to play most card type games, the tiles are manufactured in large quantities preferably of thermoplastic material and in multiple cavity molds.

A mold for forming a plurality of identical tiles is designated in FIG. 3 generally at 24 and includes a pair of separable mold parts 26 and 28 which form a plurality of mold cavities 30 (FIGS. 5 and 6) when the mold parts are in a closed relationship relative to each other. The mold cavities 30 are identical with one half of each cavity being formed in each of the mold parts 26 and 28 so that if a descernable parting line is formed between the two halves of the mold cavity 30, the parting line will be mid-way of the opposite sides of the tile 10 and all tiles will be identical and perfectly symmetrical with respect to a plane passing through the parting line.

All of the cavities 30 are in common communication with a delivery system which receives molten thermoplastic material through a sprue 32 from a source of supply such as a plastic extruder, not shown. The molten plastic flows from the sprue 32 to a main runner 34 and from the main runner to branch runners 36. Molten plastic from the branch runners 36 flows through gates 38 one of which is associated with each one of the mold cavities 30.

When the mold parts 26 and 28 are in their closed position as shown in FIG. 3, the cavities 30 are filled with molten thermoplastic material which is delivered through the sprue 32, the main runner 34, branch runners 36 and gates 38. Typically the mold 24 is cooled by water passages which are not shown so that by the time the mold cavities 30 are completely filled with molten plastic the cooling process begins and the plastic begins to solidify. At the same time, the plastic remaining in the sprue 32, main runner 34, branch runner 36 and gates 38 also solidifies so that the tiles and the delivery system are connected and form a unitary plastic member (FIG. 4).

As best seen in FIGS. 6 and 7, the branch runner 36 is formed in the mold part 26 and the gates 38 are formed in mold part 28 to communicate with runners 36. The gates 38 converge from the branches 36 to the point at which they contact the mold cavities 30. The point of communication with the cavity 30 is such that the gates 38 have a very small cross section.

To remove the molded tiles 10 from the mold 24, ejector pins 40 are provided. Preferably two ejector pins 40 are engagable with each tile 10. Also the ejector pins 40 are so arranged that, except for those disposed at the extreme ends of the mold, each of the ejector pins 40 simultaneously contacts two adjacent tiles 10. The ejector pins 40 are mounted for slidable movement axially in the mold part 28 to engage the tiles 10 and push them out of the mold cavity 30 after the mold parts have opened. An ejector plate 41 is provided to engage and simultaneously move all of the ejector pins 40 as seen in FIG. 3.

Referring now to FIG. 6, the ejector pins 40 are substantially cylindrical with a shoulder 42 on diametrically opposite sides as illustrated. The ejector pins 40 are normally seated in their retracted position with their ends 44 adjacent to the parting line between the two mold parts 26 and 28. The shoulder 42 is positioned with the ejector retracted to lie in substantially the same plane as the tile surface 14 so that the ejector creates an indentation in the frame 20 of the tile. In the retracted position of the ejector pins 40 the ejector pins act to form part of the walls of the cavities 30. The resultant molded part in the cavity 30 is formed with an indentation in the bead 23 as indicated at 48.

As seen in FIG. 8, the mold part 26 has a mold portion 50 interupting a cavity portion 51 which forms the bead 22 of the tiles 10.

The mold portion 50 forms an indentation 52 at the surface 12 of the tiles 10. The indentations 48 and 52 are identical to each other and are in alignment at opposite sides of each of the tiles.

Although the indentations 48 and 52 are shown to be of a specific shape it should be understood that other shapes can be formed. For this purpose the ejector pin 40 and mold portion 50 are appropriately shaped to provide the desired shape in the molded part. Not only can the indentations 48 and 52 be other than the illustrated shape but they also can be disposed in positions other than at the ends 16 of the tiles 10. As shown, for example, in FIG. 9, the indentations may be in the sides only or in both the ends 16 and the sides 18 as seen in FIG. 10. FIG. 11 illustrates the formation of indentations 48 and 52 in diametrically opposed corners of the frame 20 and FIG. 12 illustrates differently shaped indentations 48a and 52a in diametrically opposed corners of the surfaces 12 and 14. In each instance the indentations are formed identically at opposite sides of the tile 10 with the markings at the surface 14 formed by the ejector pins and the markings of the surface 12 being formed by mold portions duplicating the indentations made by the ejector pins.

A full cycle of molding a set of tiles 10 in the multiple cavity mold 24 includes delivering molten plastic from a source such as a plastic extruder to the sprue 32 of the mold 24 from which it flows through the main runner 34 to branch runners 36 and from the latter through the gates, one of which is associated with each of the cavities 30. The mold 24 is continuously cooled by water which causes the plastic to being solidifying after the mold cavities 30 are filled. Thereafter, the mold parts 26 and 28 are separated and relative movement between the mold part 28 and the ejector plate 41 causes simultaneous movement of all of the ejector pins or members 40 relative to the mold part 28. Such movement applies a force against the tiles 10 so that they are moved out of the cavity portion formed in the mold part 28. The ejector pin 40 also exerts a force against the solidified plastic in the branch runners 36. As best understood from FIG. 7, movement of the tiles 10 and plastic in branch runners 36 is obstructed by a portion indicated at 56 forming part of the mold portion 28. This causes the plastic in gate 38 to separate from the tile 10 at a point where the gate 38 merges with the tile 10. As pointed out above, this portion of the gate 38 is of very small cross section to facilitate separation of plastic in gate 38 from plastic in cavity 30. Once the gates 38 are severed from the tiles 10, movement of the solidified plastic in the branch runner 36 pulls the plastic formed in the gate 38 outwardly together with the branch runner 36. In this manner the tiles 10 are separated from the remainder of the plastic plug which includes the plastic in the delivery system formed by the main runner 34, branch runner 36 and gates 38.

A method for forming a plurality of identical game tiles with identical opposed surfaces has been provided wherein ejection pins for removing tiles from a multiple cavity mold also act to form indentations in one surface of the tiles and the mold is so formed that identical indentations are formed in opposed axially aligned relationship with the indentations formed by the ejection pins. In this manner opposed surfaces are formed identically and the tiles are removed from the mold in a manner automatically severing them from scrap plastic which has solidified in the delivery system. Thereafter the individual tiles are delivered to a printing machine which applies indicia to either surface of the tiles without requiring prior orientation of the tiles.

The embodiments of the invention in which an exclusive property or privilege is claimed are defined as follows:

1. In the method of making valued, two-faced plastic articles, such as game tiles and the like, wherein each article is first made by molding and then value-designating indicia is applied to a face thereof and wherein the molding of each article is conducted in a mold cavity defined by a pair of separable members with one member forming one face of the article and the other member forming the other face, and upon separation of the mold members, the molded article is forcibly ejected by ejector means in said one mold member which imparts an indentation pattern to said one face and which also causes the article to be severed from residual plastic, the improvement for yielding an article which, after having been ejected, allows its value-designating indicia to be applied to either of its two faces without regard to which faces of other molded articles value-designating indicia are applied so that the non-indicia-containing faces of the article and other molded articles appear essentially identical, said improvement comprising providing a fixed protuberance pattern in the other mold member which, during molding of the article, creates an indentation pattern in the other face of the article essentially identical to the indentation pattern imparted to the one face of the article by said ejector means.

* * * * *